United States Patent [19]

Peterson, Jr.

[11] 4,352,426

[45] Oct. 5, 1982

[54] AUGER FEED DEVICE

[75] Inventor: Russell I. Peterson, Jr., Oil City, Pa.

[73] Assignee: Conair, Inc., Franklin, Pa.

[21] Appl. No.: 202,490

[22] Filed: Oct. 30, 1980

Related U.S. Application Data

[63] Continuation of Ser. No. 44,507, Jun. 1, 1979, abandoned.

[51] Int. Cl.³ .................. B65G 33/00; B65G 21/08
[52] U.S. Cl. ........................ 198/657; 198/861
[58] Field of Search ............... 198/657, 761, 860, 861, 198/671; 222/413

[56] References Cited

U.S. PATENT DOCUMENTS

| | | | |
|---|---|---|---|
| 3,548,999 | 12/1970 | Fisher | 198/671 |
| 3,568,863 | 3/1971 | Mittelbach | 198/671 |
| 4,136,769 | 1/1979 | Dostal, Jr. | 198/671 |

*Primary Examiner*—Robert B. Reeves
*Assistant Examiner*—Brian Bond

[57] ABSTRACT

An auger feed device, and more particularly an open auger feed device for feeding scrap material to a comminution means and which includes improved means to aid in the prevention of pinch type personnel injuries, as well as to improve feeding efficiency.

13 Claims, 6 Drawing Figures

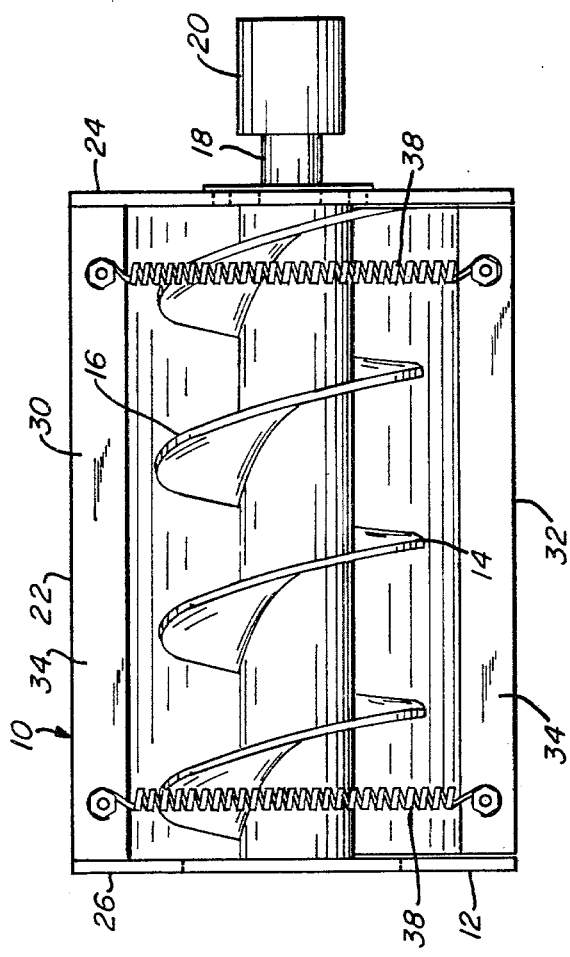
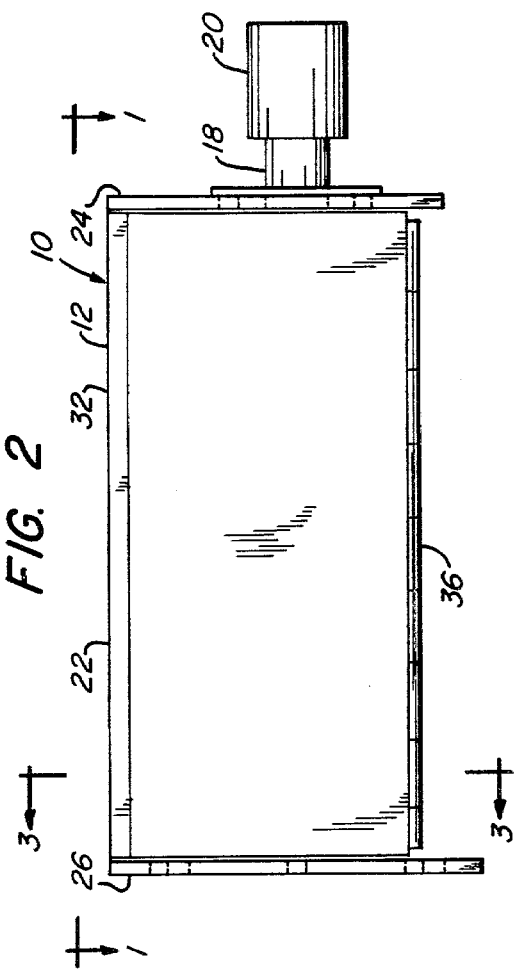
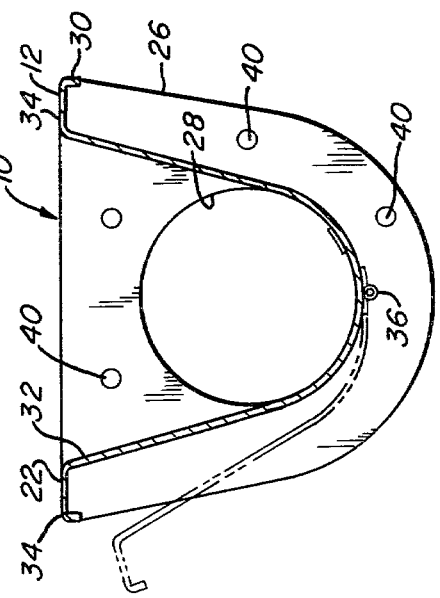

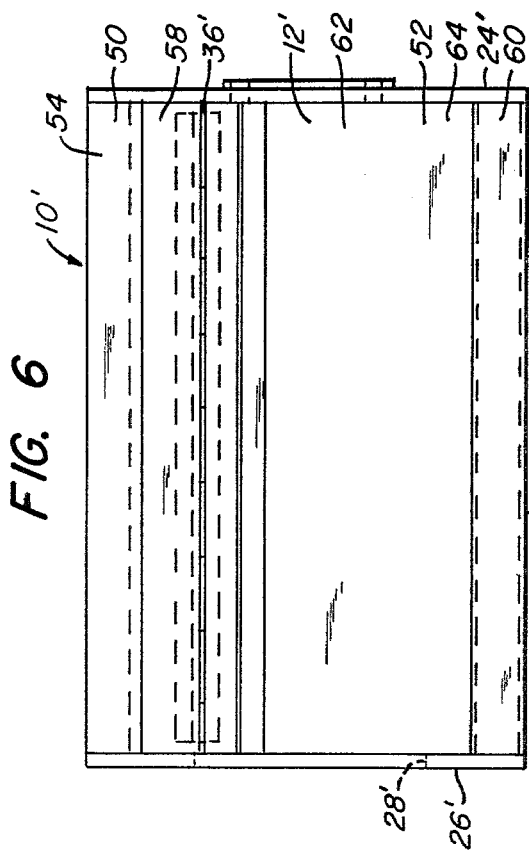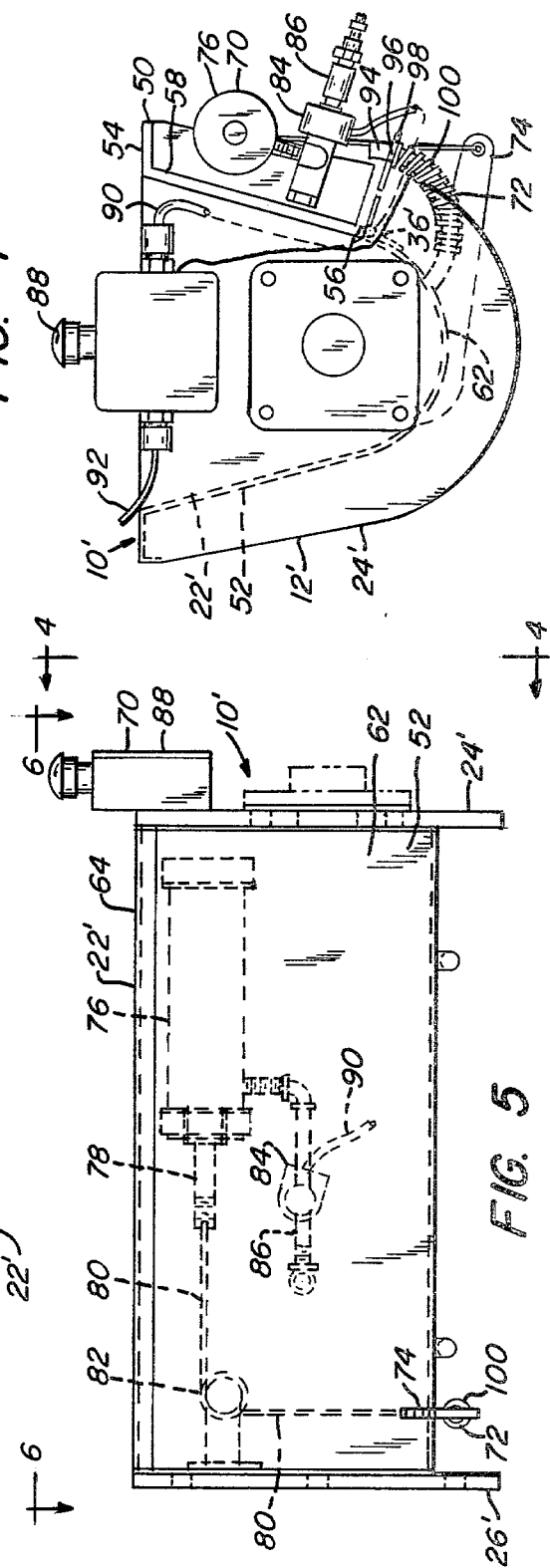

AUGER FEED DEVICE

This is a continuation of application Ser. No. 44,507, filed June 1, 1979, now abandoned.

In many industries, such as the plastics molding industry, it is common practice for personnel to work at individual stands and accumulate substantial scrap materials. For example, in the plastics molding industry, rough molded components may be fed to a personnel's specific work area by conveyor or the like for the rapid removal of flash which may be present on such components at the mold parting line. Typically, the personnel may trim the flash from the component and then pass the component to a downstream location for further handling or packaging. Such trimming is often accomplished in an assembly-line type operation and substantial quantities of scrap flash or the like may accumulate at the trimmer's work station. This scrap may be disposed of in a variety of ways; for example, manual placement in a scrap receptacle, direct deposit into a scrap processing machine, such as a comminution device or transfer by the trimmer to an auger feeding device which conveys the scrap to a comminution device.

Manual placement of scrap into a receptacle is inefficient from a time and motion standpoint, because of the additional handling involved. Furthermore, such additional handling results in a further exposure to injury by the handling personnel, for example, cuts resulting from sharp material edges. Direct deposit of the scrap by the personnel into a comminution device suffers from the same problems indicated above and presents an additional hazard to the personnel of injury caused by the rotating knives or crushing elements of the comminution device. Means to alleviate this latter-mentioned hazard, such as providing a large entry chute or hopper are costly and take up needed operational space and, as such, are often not utilized in situations where only a small comminution device is required; for example, to reduce the scrap at a flash trimmer's operating station.

Accordingly, it is common practice in situations such as at a flash trimmer's operating station, to utilize an upwardly open auger feed device to convey the scrap to an adjacent comminution device. With such an arrangement, the auger feed device is commonly mounted within the trimmer's working table or adjacent thereto and the operator need only sweep the scrap to the auger device for conveying to the comminution device. While this arrangement is generally efficient from a time and motion standpoint, certain problems have been observed. Specifically, large pieces of scrap may get stuck between the trough and the auger which have the potential of causing damage to the motor driving the auger, because of overheating, and which must also be manually loosened in order for the auger feed device to continue to convey the scrap effectively.

However, an even more serious problem arises when scrap gets stuck between the trough and the auger and this is the potential of serious bodily harm to the personnel utilizing the auger feed device. This potential arises because human nature often results in even experienced personnel electing the expeditious resolution of a problem rather than the safe, but more lengthy, solution. On occasion, personnel have attempted to dislodge the jammed scrap with their fingers while the auger is rotating. This is easily attempted for the feed auger is open along the longitudinal length thereof. Should the personnel be careless in this manual attempt to dislodge the scrap, he may get his fingers pinched between the scrap or the trough and the auger. Should the auger be rotating when a finger is thus pinched, serious bodily injury may result.

Problems similar to those discussed above also occur with the utilization of so called "automatic trim removal devices" wherein the scrap moves automatically to the auger opening by means of a belt conveyor. In these instances the trim or runner systems are removed while they are still quite hot and, as such, have a tendency to stick together or agglomerate. Such agglomerations may ride the top of the auger and inhibit further acceptance of the scrap therein. In turn, careless operators may use their hands in an attempt to force the agglomerated scrap into the auger and, as the auger suddenly accepts the agglomerated scrap, the operator's hand may be caught up in the bunched runners and serious bodily injury may result.

The present invention includes an auger feed device which includes means thereon which permit a longitudinally extending portion of the auger trough to flex or pivot outwardly. In one embodiment, this outward pivot occurs when a predetermined spring bias is overcome. This bias is calculated to be such that it will not overly restrict the conveying efficiency of the auger feed device, and will also permit relatively large pieces of scrap to be conveyed without jamming thereby decreasing the potential of serious personnel injuries. This latter result is obtained for if the operator gets his fingers pinched between the auger and adjacent trough wall, the wall will yield outwardly thus aiding the operator in quickly pulling his finger away from the auger and minimizing the potential of more serious injury.

A further embodiment of the invention herein achieves the above-mentioned advantages in a more controlled fashion by providing an automatic control button in the vicinity of the operator. The operator merely has to depress this button in order to immediately stop the auger rotation while simultaneously causing the longitudinally extending portion of the trough to flex or pivot away from the downturning auger side.

Accordingly, it is the primary object of this invention to provide an improved upwardly open auger feed device which includes a trough having a yieldable longitudinally extending portion to reduce jamming and to reduce the potential of operator injury.

It is still a further object of this invention to provide such an auger feed device which has readily accessible control means thereon which, when activated, will immediately result in the auger rotation stopping while simultaneously causing the longitudinally extending portion of the trough to flex or pivot away from the auger.

These and other objects of this invention will become more readily apparent upon a reading of the following description and drawings in which:

FIG. 1 is a plan view, partially schematic, of an auger feed device constructed in accordance with the principles of the present invention and as viewed on lines 1—1 of FIG. 2;

FIG. 2 is a side elevational view of the auger feed device of the present invention;

FIG. 3 is a transverse cross-sectional view taken on lines 3—3 of FIG. 2 but without showing the auger conveyor assembly;

FIG. 4 is an end elevational view, partially schematic, of another embodiment of an auger feed device of the present invention as viewed on lines 4—4 of FIG. 5 and which includes a control means thereon which is operative to automatically pivot an auger trough portion when actuated;

FIG. 5 is a side elevational view of such another embodiment of an auger feed device of the present invention; and FIG. 6 is a plan view as viewed on lines 6—6 of FIG. 5.

Referring to FIGS. 1 thru 3, auger feed device 10 comprises: an elongated upwardly open trough assembly 12; and an auger conveyor assembly 14 which is suitably rotatably supported within assembly 12 and is operative to convey material therealong. Feed device 10 of this invention may be utilized in a variety of circumstances; with one preferred use being in combination with a work table or area of a plastic mold stripper. In such a case, the worker strips the scrap flashing from recently molded plastics components and sweeps or otherwise deposits the scrap flashing to the feed device 10. The feed device 10 then conveys the scrap flashing to an adjacent scrap bin or comminuting device for subsequent disposal or reprocessing (neither the bin nor comminuting device being illustrated).

Auger conveyor assembly 14 may be of any suitable type which will cooperate with the adjacent inner peripheral walls of trough assembly 12 for the conveying of material longitudinally therealong. As shown, conveyor assembly 14 comprises an elongated helical auger member 16 which is rotatably driven about the longitudinal axis thereof by an elongated coaxially extending drive shaft 18. Shaft 18 is suitably rotatably supported adjacent to respective axial ends of trough assembly 12 and is rotatably driven in any known manner; for example, by an electrically energizable drive motor which is schematically illustrated at 20.

Trough assembly 12 comprises: a longitudinally extending generally "U" shaped main body member 22; a first end wall member 24 which closes one axial end of body member 22 and which releasably supports the motor 20; and another end wall member 26 which is carried by body member 22 adjacent the axial end thereof opposite wall member 24. Auger member 16 is arranged and positioned within trough assembly 12 to convey material from the first end wall member 24 and towards the end wall member 26. Wall member 26 inclues a transversely extending discharge opening 28 therethrough which is positioned to allow the material conveyed by auger member 16 to be discharged from feed device 10 through the opening 28. The bin or comminution device discussed above will be positioned adjacent the discharge opening 28.

Trough assembly 12 is structured in accordance with this invention to alleviate the potential of a worker's fingers being pinched between the auger member 16 and the adjacent inner peripheral wall of assembly 12 and also to alleviate the potential of oversize scrap material becoming jammed between these adjacent cooperating surfaces. These problems are particularly acute at peripheral wall areas of assembly 12 adjacent the downward revolution of the flight surfaces of the auger member 16. The areas of assembly 12 adjacent the upward revolution of the flight surfaces of auger member 16 do not present as serious a potential of pinching for the action of the auger member 16 at these areas would tend to push obstructions away rather than pinch the obstructions as is the case during the downward portion of the revolution of member 16. To accomplish this purpose, the trough body member 22 is split longitudinally to form relatively identically shaped trough sections 30 and 32, each of which generally form one-half of the "U" shaped configuration of body member 22 and each of which has a continuous longitudinally and outwardly extending flange 34 integrally formed therewith adjacent the uppermost end thereof.

Trough section 30 extends between the longitudinally spaced end walls 24 and 26 and is relatively immovably secured thereto adjacent respective axial ends thereof. Trough section 32 also extends between the end walls 24 and 26; however, section 32 is rendered pivotal with respect to walls 24 and 26 and also with respect to section 30 by trough section hinge means 36. Hinge means 36 extends continuously along body member 22 at the lowest point of the "U" shaped configuration and joins sections 30 and 32 together at the innermost sides thereof. Hinge means 36 may be of any suitable construction which will provide a pivotal-type movement of section 32 with respect to the stationary section 30 (See the phantom displacement of FIG. 3) and as shown in FIGS. 2 and 3, hinge means 36 is a continuous longitudinally extending piano-hinge type. As arranged, the trough section 32 will be adjacent the down turning side of the auger member 16 and section 30 will be adjacent the up turning side thereof. Also, as is best illustrated in FIG. 1, a longitudinally spaced pair of bias and return springs 38 extend between sections 30 and 32 adjacent the uppermost surfaces thereof. As shown, each spring 38 extends transversely between sections 30 and 32 and has respective axial ends thereof secured to adjacent portions of flanges 34. In the closed position of body member 22, as indicated in solid in FIG. 3, springs 38 will be under slight tension. The tension of springs 22 will increase proportionally as trough section 32 is pivoted away from section 30.

Additional structural details illustrated in the drawings show a plurality of bores 40 in end wall 26 for use with bolts or the like to secure the feed device 10 to the entry of a comminuting device. Additional support for the feed device 10 can be had with external supports cooperating with the flange 34 of the fixed trough section 30 or with the end wall 24 or in any other suitable manner.

The combined bias of return springs 38 is calculated to normally retain section 32 in the closed position thereof to a degree which will not overly restrict the conveying efficiency of the auger feed device 10 but which will allow a pivoting of trough section 32 about hinge means 36 to decrease the potential of serious personnel injuries as well as permitting relatively large pieces of scrap to be conveyed by feed device 10 without jamming occurring. Springs 38 additionally provide a return bias which is necessary to return section 32 to the closed position thereof after an obstruction has passed or been withdrawn from the device 10. It is to be understood that, depending on the particular structural configuration utilized, hinge means 36 may also provide a degree of bias which may have to be considered when calculating the desired combined bias of springs 38.

FIGS. 4, 5 and 6 illustrate another embodiment of an auger feed device 10' which is constructed in accordance with the principles of the present invention. Inasmuch as feed device 10' contains certain automatic features therein, it is somewhat more sophistocated than the device 10 described hereinbefore; however, the broad aspects of the operation and construction thereof are similar to device 10. Accordingly, for purposes of the description hereinafter, elements of device 10' which are similar to like elements of device 10 will be identified by identical reference numerals primed. Furthermore, device 10', as illustrated in FIGS. 4, 5 and 6, does not include a showing of the auger conveyor assembly 14 or motor 20. Accordingly, for a showing and description of such latter elements, as well as other elements which are shown but not fully described in the description of device 10', reference is made to the description set forth hereinabove with reference to auger feed device 10.

Auger feed device 10' includes an elongated upwardly open trough assembly 12' which rotatably supports an auger conveyor assembly (not shown) therewithin. Trough assembly 12' comprises: a longitudinally extending generally "U" shaped main body member 22'; a first end wall member 24' which closes one axial end of body member 22' and which supports a motor (not shown), which is operative to drive the auger conveyor assembly; and another end wall member 26' which is carried by body member 22' adjacent the axial end thereof opposite wall member 24'. The auger conveyor assembly is arranged and positioned within the trough assembly 12' to convey material from the first end wall member 24' and towards the end wall member 26'. End wall member 26' includes a discharge opening 28' therethrough which is positioned to allow the material conveyed by the auger assembly to be discharged from the feed device 10' through the opening 28'.

Similar to the purposes stated hereinabove in the description of trough assembly 12, trough assembly 12' is also structured in accordance with this invention to alleviate the potential of operator injury and jamming during the conveying of oversize scrap material. To accomplish this purpose, the trough body member 22' is split longitudinally to form a pair of transversely adjacent trough sections 50 and 52.

Trough section 50 is formed in the general configuration of an outwardly toed channel member having upper and lower flange portions 54 and 56, respectively, and a web portion 58 extending between portions 54 and 56. Trough section 50 extends between the longitudinally spaced end walls 24' and 26' and is relatively immovably secured to walls 24' and 26' adjacent respective axial ends thereof. Trough section 52 comprises: an upper outwardly extending flange portion 60 which, as shown, lies in a common horizontal plane with flange portion 54; a lower generally arcuate trough bottom portion 62; and a wall portion 64 which has the lower end thereof at one arcuate end of trough bottom portion 62 and extends upwardly therefrom in a manner that the upper end thereof communicates with the inner end of flange portion 60. If desired, trough section 52 may be fabricated as a weldment or, as shown, may be formed from a single sheet or plate by appropriate bending to form portions 60, 62 and 64. The arcuate trough bottom portion 62 is symmetrical with respect to the longitudinal axis of feed device 10'.

Trough section 52 also extends between the end walls 24' and 26'; however, section 52 is rendered pivotal with respect to walls 24' and 26' and also with respect to section 50 by trough section hinge means 36'. Hinge means 36' extends continuously longitudinally along body member 22' and joins sections 50 and 52 together at the adjacent sides thereof. Hinge means 36' may be of any suitable construction which will provide a pivotal-type movement of section 52 with respect to the stationary section 50, for example, a continuous longitudinally extending piano-hinge type. Web 58 of trough section 50 forms the other generally vertically extending wall of the main body member 22'.

With a trough assembly 12' as described above, the general operation thereof insofar as the pivotal movement of section 52 with respect to section 54 is essentially identical (except for the differing location of the hinge means 36') to the movement of section 32 with respect to section 30 as described hereinabove in the description of feed device 10. However, feed device 10' includes a powered pivoting means 70 as well as a biased trough section closure means 72. Closure means 72 provides substantially the same function as springs 38; however, it is at a different location which will not interfere with the entry of scrap to the upwardly open end of trough assembly 12'.

Powered pivoting means 70 may be of any suitable construction which will result in the powered pivoting of trough section 52 away from the fixed trough section 50 about the hinge means 36. As illustrated in FIGS. 4 and 5, pivoting means 70 comprises: a lever arm 74 which is secured to the outer periphery of the trough bottom portion 62 and extends outwardly therefrom in the direction of trough section 50; and a piston assembly 76 which is secured to an outer peripheral portion of web portion 58, spaced upwardly from lever arm 74, and has a reciprocal piston shaft 78 thereof in communication with lever arm 74 by means of a control cable 80. As illustrated, cable 80 extends generally horizontally from shaft 78, is trained 90 degrees about a pulley assembly 82 and extends vertically downwardly therefrom into communication with lever arm 74 adjacent the outer free end thereof.

Pulley assembly 82 is powered in any suitable manner and, as illustrated, is of the pneumatic type and includes a solenoid valve 84 disposed within the air inlet line 86. Solenoid valve 84 receives the operational signal therefor from a suitable control means, illustrated as button assembly 88, which is carried by end wall 24' adjacent an upper outer peripheral portion thereof. Button assembly 88 communicates with solenoid valve 84 via line 90. With such an arrangement, when conditions so dictate, an operator depresses button assembly 88 which in turn causes valve 84 to shift to permit air to flow to the front side of the piston (not shown) within piston assembly 76. This will result in piston shaft 78 reciprocating inwardly and, because of communication therewith by control cable 80, an upward force is applied at lever arm 74. This upward force will in turn result in trough section 52 pivoting outwardly, away from the downturning side of an auger member which is received within trough assembly 12', about the hinge means 36'. If desired, depression of button assembly 88 can also be arranged, via a line 92 which communicates between assembly 88 and a power line for providing current for the rotation of the auger member, to cause a cessation of rotation of the auger member simultaneously with the outward pivoting of trough section 52. It is to be noted that a single non-continuous depression of button assembly 88 will result in the section 52 being maintained in the outwardly pivoted position thereof and also a continuing cessation of rotation of the auger member until a suitable resetting sequence is completed.

The bias to normally maintain trough section 52 in the closed position thereof as well as to return it to the closed position thereof after outward pivoting is provided by the trough section closure means 72. Closure means 72 includes a generally arcuately shaped cylindrical member 94 which has the lower end thereof suitably affixed to lever arm 74 and which curves outwardly and upwardly therefrom in a manner that an upper arcuate end portion thereof is captively and reciprocatively received within a bore which extends generally vertically through a keeper plate 98 which is secured to lower flange portion 56 and extends outwardly therefrom. A compression spring 100 is coaxially received around arcuate member 94 and is captively retained between lever arm 74 and keeper plate 98.

The embodiments described herein are the presently preferred embodiments of auger feed devices of the present invention; however, it is understood that various modifications may be made to the embodiments described herein by those skilled in the art without departing from the scope of the invention as is defined by the claims set forth hereinafter. For example, the trough assemblies 12 and 12' may have the exterior surfaces thereof structured to be received directly within a support and operator's work table; hinge means 36 and 36' may be structured in alternative fashions rather than the piano-hinge configuration as is shown; a biasing spring may be integrated within hinge means 36 to provide the necessary bias for section 32, thereby alleviating the necessity to also provide the independent return springs 38; springs 38 may be positioned in alternative locations, if desired; pivoting trough section 32 may be formed as a plurality of longitudinally adjacent trough portions so long as means are provided for the retaining and return bias of each portion with respect to the stationary trough section 32; an arrangement such as trough section closure means 72 may be substituted for the springs 38 of feed device 10; and the like.

What is claimed is:

1. An auger feed device comprising: an elongated auger rotatable about the central longitudinal axis thereof and having a discharge end; an elongated trough assembly having a longitudinally extending upwardly open trough portion; said auger extending longitudinally within said trough portion and cooperable therewith to convey material received within said trough portion to a discharge opening in one end of said trough assembly adjacent said discharge end; said trough portion comprising a pair of transversely adjacent longitudinally extending trough sections with one of said trough sections being a rigid portion of said trough assembly and the other of said trough sections being pivotably movable with respect to said one of said trough sections about an axis located at least below said central axis and extending longitudinally throughout at least the major longitudinal extent of said trough portion; and biasing means carried by said trough assembly which is operative to normally bias said other of said trough sections in cooperative operating relationship with said auger while permitting said other of said trough sections to pivot away from said one of said trough sections when said bias is overcome.

2. An auger feed device as specified in claim 1 wherein pivot means to permit such pivotable movement of said other of said trough sections is carried by both of said trough sections.

3. An auger feed device as specified in claim 2 wherein at least a portion of said biasing means is integral with said pivot means.

4. An auger feed device as specified in claim 1 wherein said axis extends continuously throughout the longitudinal extent of said trough portion.

5. An auger feed device as specified in claim 1 wherein said axis is located in a common vertical plane with said central axis.

6. An auger feed device as specified in claim 1 additionally including driving means to rotatably drive said auger about said central longitudinal axis.

7. An auger feed device as specified in claim 1 wherein said trough portion has a generally "U" shaped cross-sectional configuration and each of said trough sections has a cross-sectional configuration of substantially one-half of said "U".

8. An auger feed device as specified in claim 1 wherein said biasing means is positioned adjacent the upper portion of said trough portion and extends transversely between said trough sections.

9. An auger feed device as specified in claim 8 wherein said biasing means comprises a plurality of biasing means spaced longitudinally with respect to said trough portion.

10. An auger feed device as specified in claim 1 additionally including selectively actuatable power means which when actuated is operative to cause said other of said trough sections to pivot away from said one of said trough sections.

11. An auger feed device as specified in claim 10 wherein said power means is also operative upon energization to simultaneously cause the cessation of rotation of said auger.

12. An auger feed device as specified in claim 10 wherein said biasing means cooperates with said other of said trough sections adjacent the lowermost extent thereof.

13. An auger feed device as specified in claim 10 wherein said power means includes a piston assembly which is operative upon energization of said power means to cause said other of said trough sections to so pivot.

* * * * *